United States Patent
Cauwenberghs et al.

(10) Patent No.: US 10,664,773 B2
(45) Date of Patent: May 26, 2020

(54) METHOD AND SYSTEM FOR A TRANSPORTATION MOBILITY PLATFORM

(71) Applicant: Mastercard International Incorporated, Purchase, NY (US)

(72) Inventors: Alain Cauwenberghs, Meise (BE); Concetta Procopio, Liberchies (BE); Joost Vastenavondt, East Flanders (BE); Menno Dellisse, Uccle (BE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 267 days.

(21) Appl. No.: 15/671,401

(22) Filed: Aug. 8, 2017

(65) Prior Publication Data
US 2018/0046958 A1 Feb. 15, 2018

Related U.S. Application Data

(60) Provisional application No. 62/372,451, filed on Aug. 9, 2016.

(51) Int. Cl.
*G06Q 10/06* (2012.01)
*G06Q 20/32* (2012.01)
(Continued)

(52) U.S. Cl.
CPC ..... *G06Q 10/06311* (2013.01); *G06Q 10/107* (2013.01); *G06Q 20/3224* (2013.01);
(Continued)

(58) Field of Classification Search
None
See application file for complete search history.

(56) References Cited

U.S. PATENT DOCUMENTS

2015/0052486 A1* 2/2015 Goodman ........... G06F 3/04817
715/835
2015/0057837 A1* 2/2015 Moore, Jr. ............. G06Q 10/02
701/2

(Continued)

FOREIGN PATENT DOCUMENTS

EP 2 881 906 A1 6/2015

OTHER PUBLICATIONS

Notification of Transmittal of the International Search Report and the Written Opinion of the International Searching Authority (Forms PCT/ISA/220, PCT/ISA/210, and PCT/ISA/237) dated Oct. 23, 2017, in the corresponding International Application No. PCT/US2017/045701. (15 pages).

*Primary Examiner* — James A Edwards
(74) *Attorney, Agent, or Firm* — Buchanan Ingersoll & Rooney PC

(57) ABSTRACT

A method for providing travel service options to a traveler mobile device includes: storing, account profiles, each including data related to a transaction account including an account identifier and contact information; storing transaction rules, each associated with a travel service option and including a required action; receiving a data message including a specific account identifier, travel reservation, and data fields; identifying, a specific account profile that includes the specific account identifier; identifying a program application based on the specific account profile and travel reservation; processing a transaction rule for the program application based on data included in the data fields; and performing the required action included in the identified transaction rule, wherein the required action includes transmitting at least one travel service option associated with the program application.

20 Claims, 8 Drawing Sheets

(51) Int. Cl.
*G06Q 10/10* (2012.01)
*G06Q 30/02* (2012.01)
*G06Q 50/30* (2012.01)
*H04L 12/58* (2006.01)

(52) U.S. Cl.
CPC ......... *G06Q 30/0284* (2013.01); *G06Q 50/30* (2013.01); *H04L 51/04* (2013.01)

(56) References Cited

U.S. PATENT DOCUMENTS

| | | |
|---|---|---|
| 2015/0088643 A1 | 3/2015 | Shuken et al. |
| 2015/0206251 A1* | 7/2015 | Yofe ..................... G06Q 40/12 |
| | | 705/30 |
| 2015/0317749 A1* | 11/2015 | Soviany ................. G06Q 40/00 |
| | | 705/30 |
| 2016/0078524 A1 | 3/2016 | Shuken et al. |

* cited by examiner

METHOD AND SYSTEM FOR A TRANSPORTATION MOBILITY PLATFORM

FIELD

The present disclosure relates to the providing of a transportation mobility platform that provides travel service options to a traveler mobile device, specifically the use of a platform that provides data to relevant application programs on traveler mobile devices to provide a streamlined travel service experience to a traveler through the use of a specially configured backend processing server that identifies, analyzes, and provides travel data to relevant application programs.

BACKGROUND

Millions of travelers travel every single day for any number of reasons, such as for regular transportation to and from work or school, for vacation, to visit family, for business, etc. Often times, the travel experience is broken into a vast number of disparate experiences. For instance, a traveler going on a business trip may travel from their house to a first airport, may fly from there to a second airport, may take ground transportation to a hotel, check in to the hotel, take other transportation to a business meeting, travel to dinner from the business meeting, and then back to the hotel. Each of these experiences, the four different ground transportation experiences, the flight, the hotel check-in, and the dinner reservation, may be use different services via different service providers, and may themselves also involved additional experiences. For instance, the traveler may take their personal vehicle to travel to the first airport and may have to arrange parking at the airport, may use a shuttle to travel to the hotel, may be picked up by a car service to travel to the business meeting, may ride with a colleague to the dinner, and may take a taxi from dinner to the hotel.

With such an itinerary, the traveler may end up using eight or more different services to accomplish their travel. Each of these services may be separately booked and managed by the traveler, which may be a difficult and time consuming undertaking. In many cases, the service providers may have application programs or websites that may be accessed via the traveler's mobile device for easier usage. However, this may require that the traveler manage different accounts and corresponding credentials for each of the webpages, or store and access each of the different application programs on their device. Not only is this inconvenient for the traveler, for more complicated itineraries, it may be difficult for the traveler to remember what application they need to use for which experience in their journey.

Thus, there is a need for a technological solution to enhance a traveler's travel experience by providing a transportation mobility platform designed to provide backend support to service providers to assist in the providing of travel service options to a traveler via their mobile device.

SUMMARY

The present disclosure provides a description of systems and methods for the providing of travel service options to a traveler mobile device via a backend processing server. The processing server may communicate with travel service providers to provide data that may be used in the providing of travel service options to a traveler via their mobile device, which may enable a traveler to receive travel support without having to personally manage a wide array of applications and service provider credentials, and also enable service providers to provide more assistance to travelers without significant modification to their existing systems and services.

A method for providing travel service options to a traveler mobile device includes: storing, in an account database of a processing server, a plurality of account profiles, wherein each account profile includes data related to a transaction account including at least an account identifier and contact information; storing, in a rules database of the processing server, one or more transaction rules, wherein each transaction rule is associated with a travel service option and includes at least one required action; receiving, by a receiving device of the processing server, a data message associated with a transaction, wherein the data message includes at least a specific account identifier, a travel reservation, and one or more data fields; identifying, by a processing device of the processing server, a specific account profile stored in the account database based on the specific account identifier included in the received transaction message; identifying, by the processing device of the processing server, a program application based on the specific account profile and the travel reservation; processing, by the processing device of the processing server, a transaction rule of the one or more transaction rules stored in the rules database for the program application based on data included in the one or more data fields included in the received data message; and performing, by the processing device of the processing server, the at least one required action included in the identified transaction rule, wherein the at least one required action includes transmitting, by a transmitting device of the processing server, at least one travel service option associated with the program application.

A system for providing travel service options to a traveler mobile device includes: an account database of a processing server configured to store a plurality of account profiles, wherein each account profile includes data related to a transaction account including at least an account identifier and contact information; a rules database of the processing server configured to store one or more transaction rules, wherein each transaction rule is associated with a travel service option and includes at least one required action; a receiving device of the processing server configured to receive a data message associated with a transaction, wherein the data message includes at least a specific account identifier, a travel reservation, and one or more data fields; and a processing device of the processing server configured to: identify a specific account profile stored in the account database based on the specific account identifier included in the received data message; identify a program application based on the specific account profile and the travel reservation; process a transaction rule of the one or more transaction rules stored in the rules database for the program application based on data included in the one or more data fields included in the received data message; and perform the at least one required action included in the identified transaction rule, wherein the at least one required action includes transmitting, by a transmitting device of the processing server, at least one travel service option associated with the program application.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
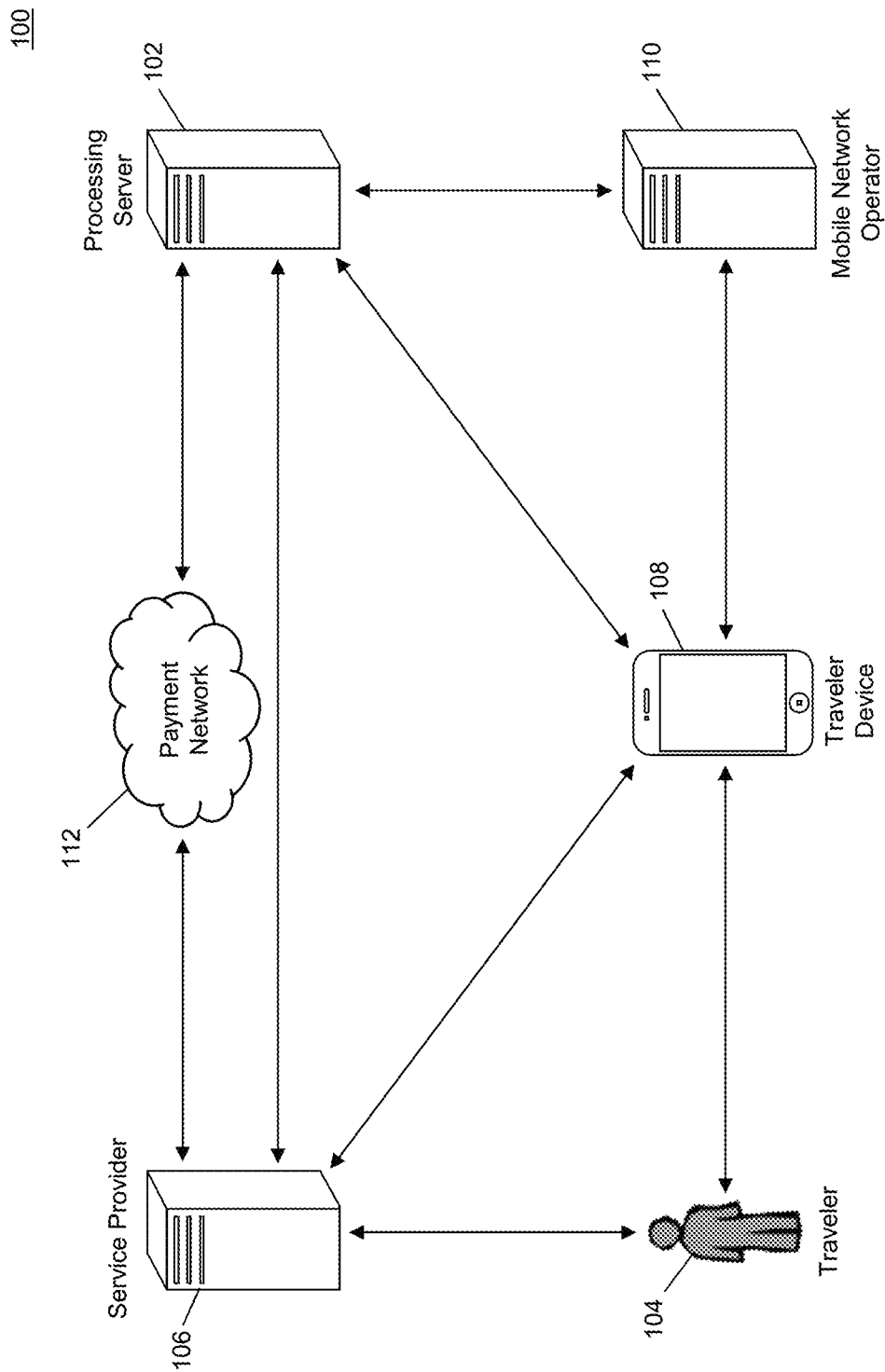
FIG. 1 is a block diagram illustrating a high level system architecture for providing a transportation mobility platform in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a traveler, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a traveler or another merchant. A merchant may be a traveler, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Transportation Mobility Platform

FIG. 1 illustrates a system 100 for the providing of a transportation mobility platform configured to provide travel service options to a traveler via a traveler mobile device, for the enhancement of a traveler's travel experience based on accessed services and payment transactions.

The system 100 may include a processing server 102. The processing server 102, discussed in more detail below, may be configured to provide a transportation mobility platform, which is configured to provide travel service options to a traveler 104 as part of a travel experience. The traveler 104 may engage with one or more service providers 104 as part of a travel experience. A travel experience may comprise one or more actions undertaken by the traveler 104 that comprises a travel activity or any other activity related thereto. Such activities may include, for example, transporting from one location to another, checking in or out or staying overnight at a hotel, attending an event, eating at a restaurant, visiting an attraction, etc. In some instances, a travel experience may consist of a single activity, such as transporting from one location to another. In some cases, a travel experience may comprise dozens, or even hundreds, of activities that may be spread across days, weeks, or months. For instance, a family vacation traveling across Europe may include dozens of activities each day and may continue for several weeks or months.

As part of the traveler's travel experience, the traveler 104 may interact with a service provider 106 using a traveler device 108. The traveler device 108 may be any type of computing device suitable for performing the functions discussed herein, such as a desktop computer, laptop computer, notebook computer, tablet computer, cellular phone, smart phone, smart television, smart watch, wearable computing device, implantable computing device, etc. In an exemplary embodiment, the traveler device 108 may be a mobile computing device, where a geographic location of the traveler device 108 may be used in the providing of travel service options.

The traveler device 108 may communicate with the service provider 106 via electronic data exchanges to and from each of the respective computing systems. In some instances, the traveler device 108 may store an application program associated with the service provider 106, which may be executed by the traveler device 108 and relevant data displayed or otherwise communicated to the traveler 104. In other instances, the traveler device 108 may use a third party application program, such as a web browsing application program, to access data associated with a service provider 106, such as via a web site associated with the service provider 106.

The traveler 104 may access a travel-related service provided by a service provider 106. The service may be based on the industry of the service provider 106, needs of the traveler 104, etc. Travel-related services may include, for instance, the arrangement, purchase, or use of transportation (e.g., ground, air, sea, rail, etc.); the purchase of, checking-in to, or checking-out of hotel or other sleeping accommodations; the placing of a reservation at a restaurant; the checking-in to a reservation at a restaurant; the reservation or payment of parking; etc. As the traveler 104 accesses the service, the service provider 106 may contact the processing server 102. The contact may be accomplished via the electronic transmission of a data signal to the processing server 102 via a suitable communication network and method, such as a local area network, wireless area network, cellular communication network, the Internet, etc. The data signal may be superimposed with data related to the accessed service and the traveler 104.

The data may include, for example, an account identifier associated with the traveler 104. The account identifier may be used to identify an account profile, discussed in more detail below, which may be used to store data associated with the traveler 104 and their travel experiences. The data may also include data related to the accessed service, such as a geographic location, service type, service quality, traveler interest, etc. For instance, if the service provider 106 is an airline, the airline may provide the processing server 102 with the airport at which the traveler 104 lands, the time when the traveler 104 is landing, the flight class for the traveler 104, and the traveler's stated reason for travel, in addition to an identifier for the traveler 104.

The processing server 102 may receive the data from the service provider 106 and may then identify travel service options. Travel service options may be options for further travel services that are based on the traveler's current travel service, and may also be related on additional data, such as prior travel experiences, prior travel activities in the current travel experience, and other traveler data, such as transaction data, as discussed in more detail below. For instance, in the above example, the processing server 102 may, based on the traveler's arrival at an airport, identify one or more car services for transportation from the airport. The processing server 102 may then respond to the service provider 106 with the identified travel service options, via the electronic transmission of a data signal back to the service provider 106 that is superimposed or otherwise encoded with the travel service options.

In some instances, the travel service options may be a list of identified service providers 106. In other instances, the processing server 102 may identify additional data related to the service options. For instance, in the above example, the processing server 102 may identify pricing and time (e.g., of availability or transport) information for each of the identified car services, such as based on historical data (e.g., for past transportation from that airport), stored data (e.g., pricing data provided by the related service providers 106), or obtained data (e.g., as requested from the related service provider 106 for the traveler 104). In some cases, the travel service options may include links to application programs, web sites, or other methods for accessing the related service providers 106. In some such cases, the travel service options may only include options for service providers 106 with whom the traveler 104 is registered or where the traveler device 108 includes an application program associated with the service provider 106.

The service provider 106 may receive the travel service options and may push them to the traveler device 108. In some instances, the travel service options may be pushed to the traveler device 108 via the service provider's application program, or other suitable communication method, such as via e-mail, short messaging service message, multimedia messaging service message, etc. The traveler device 108 may display the travel service options to the traveler 104. The traveler 104 may choose to go with one of the service options, or may deny the use of the service options. For instance, in the above example, the traveler 104 may decline the use of a car service if they already arranged transportation from the airport, or may select a car service to use. In latter instances, the traveler 104 may be connected with the related service provider 106, such as being redirected to the service provider's website or having the application program associated with the service provider 106 executed on the traveler device 108.

The processing server 102 may continue to provide travel service options to the traveler 104 via the service providers 106. In some embodiments, the traveler 104 may register with the processing server 102 for the receipt of travel service options directly. In such an instance, the processing server 102 may electronically transmit travel service options to the traveler device 108 based on service data received from service providers 106 for the traveler's travel experience. In some instances, data transmitted by the processing server 102 to the traveler device 108 may be electronically transmitted via a mobile network operator 110 associated with the traveler device 108. The mobile network operator 110 may be an entity associated with a cellular communication network that is used by the traveler device 108 for transmitting and receiving data signals. In such instances, the processing server 102 may electronically transmit a data signal to the mobile network operator 110, which may forward the data signal to the traveler device 108 for receipt thereby.

As a result, the processing server 102 may provide for travel service options throughout a traveler's entire travel experience. For instance, the traveler 104 may purchase a ticket for a flight from a service provider 106, which may provide data related thereto to the processing server 102. The processing server 102 may then provide travel service options to the traveler 104 for transportation to the airport. Following the traveler's travel to the airport, the processing server 102 may provide service options for checking in to their flight, transportation at the airport (e.g., maps for navigating to their gate, times for terminal transportation, etc.), etc. Once the traveler 104 arrives at their destination airport, the processing server 102 may provide travel service options for transportation at the airport and/or transportation from the airport to a destination, such as a hotel previously purchased by the traveler 104. The processing server 102 may continue to provide travel service options for the traveler's travel experience all the way until they arrive home.

In some embodiments, the processing server 102 may identify travel service options based on past preferences, selections, and travel experiences of the traveler 104. For instance, if the traveler 104 regularly selects a specific car service for transportation to/from an airport, the processing server 102 may identify that car service as a preferred travel service option when leaving from or traveling to that airport. In another example, if the traveler 104 prefers to check in to their hotel before eating dinner when traveling, the travel service options for that traveler 104 may reflect that preference. In yet another example, the processing server 102 may identify restaurants based on previous cuisine and type preferences for the traveler 104 as identified from prior travel experiences of the traveler 104.

In some embodiments, the processing server 102 may utilize transaction data associated with the traveler 104 for the selection and prompting of travel service options. In such an embodiment, the traveler 104 may participate in payment transactions for the purchase of products related to their travel experience, such as plane tickets, taxis, car service reservations, hotel reservations, parking, restaurants, etc. The payment transactions may be processed by a payment network 112. The payment network 112 may be configured to process payment transactions using traditional methods and systems related thereto. In some embodiments, the payment network 112 may be configured to electronically transmit transaction data for the payment transactions to the processing server 102. In other embodiments, the service provider 106 involved in a payment transaction as a merchant may electronically transmit transaction data for the payment transaction to the processing server 102. In yet other embodiments, the processing server 102 may be a part of the payment network 112 and may receive the transaction data as part of the processing of payment transactions.

Transaction data may include an account identifier associated with the traveler 104. In some instances, the account identifier may be the same identifier used by service providers 106 for identification of the traveler 104, which may be added to the transaction data for such usage. In other instances, the account identifier may be a primary account number associated with a transaction account related to the traveler 104 used to fund the payment transactions. The transaction data may also include a travel reservation. The travel reservation may be comprised of data related to the service provider 106 and/or the service provided to the traveler 104, such as a provider name, provider industry, traveler preferences, confirmation number, service cost, arrival time, departure time, arrival location, destination location, reservation number, party size, etc. The transaction data may also include one or more data fields, which may include additional data associated with the payment transaction, which may be used by the processing server 102 in the identification of travel service options. Such data may include, for example, transaction time, transaction date, transaction amount, geographic location, merchant name, merchant industry, merchant category code, product data, merchant data, traveler data, issuer data, acquirer data, loyalty data, reward data, offer data, etc.

In some instances, the processing server 102 may receive the transaction data as a transaction data entry for each payment transaction. In other instances, the transaction data for a payment transaction may be included in a transaction message received for that payment transaction. A transaction message may be a specially formatted data message that is formatted pursuant to one or more standards governing the exchange of financial transaction messages, such as the International Organization for Standardization's ISO 8583 and ISO 20022 standards. Transaction messages may include a message type indicator indicative of the type of payment transaction, and a plurality of data elements, wherein each data element includes data related to the payment transaction, such as a data element configured to store a primary account number, a data element configured to store a transaction amount, etc. In some embodiments, the transaction message may also include one or more bitmaps, which may indicate the data elements included in the transaction message and the data stored therein.

The processing server 102 may receive the transaction data and may store the transaction data in the account profile associated with a traveler 104. The processing server 102 may then use the transaction data in the identification of travel service options provided to the traveler 104. For example, the traveler 104 may purchase a plane ticket and a hotel reservation using a transaction account. The processing server 102, knowing of the traveler's hotel reservation as a result of the transaction data, may provide the traveler 104 with specialized travel service options for getting from the airport to the hotel once they arrive, which may include price and time estimates that are accurate due to knowledge of the intended destination. In another example, the processing server 102 may store transaction data for past travel experiences of the traveler 104, which may illustrate the traveler's propensity to attend the opera when on vacation. As a result, the processing server 102 may present a travel service option to attend the opera during the evening while the traveler 104 is on vacation as part of their travel experience.

The methods and systems discussed herein may enable the processing server 102 to provide a backend platform to service providers 106 and travelers 104 for the providing of travel service options to travelers 104 to enhance their travel experience. By using a single, backend platform, the processing server 102 may provide travel service options to travelers 104 and service providers 106 without requiring the traveler 104 to obtain and use a wide variety of service providers 106 and associated application programs, and without requiring service providers 106 to establish agreements with other service providers 106 or interact with other service provider applications and web sites. As a result, a traveler 104 may have a more unified and simplified travel experience, which can be further enhanced and customized with specialization that utilizes prior travel experience and transaction data.

Processing Server

Figure 2:
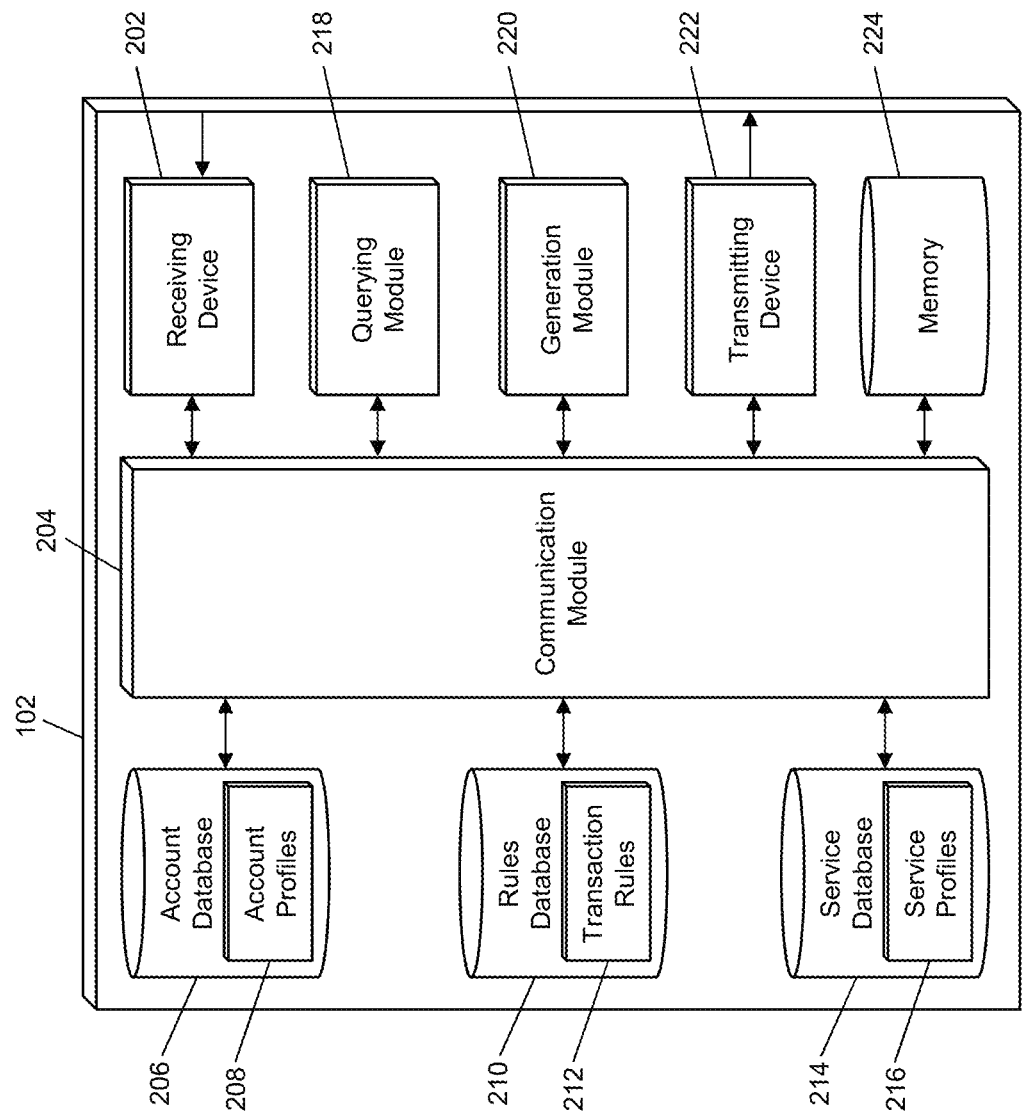
FIG. 2 is a block diagram illustrating the processing server of FIG. 1 for the providing of travel service options to a traveler mobile device in accordance with exemplary embodiments.

FIG. 2 illustrates an embodiment of a processing server 102 of the processing system 102 in the system 100. It will be apparent to persons having skill in the relevant art that the embodiment of the processing server 102 illustrated in FIG. 2 is provided as illustration only and may not be exhaustive to all possible configurations of the computing systems 200 of the processing system 102 suitable for performing the functions as discussed herein. For example, the computer system 700 illustrated in FIG. 7 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from service providers 106, traveler devices 110, mobile network operators 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by service providers 106, which may be superimposed or otherwise encoded with data messages that are related to travel service transactions, which may be payment transactions or non-payment transactions (e.g., a restaurant reservation). The data messages may include an account identifier related to a traveler 104 involved in the travel service, a travel reservation, and one or more data fields related thereto. The receiving device 202 may also be configured to receive transaction data entries and/or transaction messages, which may be electronically transmitted by payment networks 112 or service providers 106 or other merchants, which may include data related to a payment transaction including a transaction amount, transaction time, transaction date, geographic location, etc.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include an account database 206. The account database 206 may be configured to store a plurality of account profiles 208 using a suitable data storage format and schema. The account database 206 may be a relational database that utilizes structured query language for the storage, identification, modifying, updating, accessing, etc. of structured data sets stored therein. Each account profile 208 may be a structured data set configured to store data related to a traveler 104 and/or transaction account. The account profile 208 may include at least an account identifier and contact information. The account identifier may be a unique value suitable for use in the identification of the account profile 208, such as an identification number, username, email address, telephone number, device identifier, primary account number, etc. The contact information may include data associated with a traveler device 108 associated with the related traveler 104 and/or transaction account used for the receipt of travel service options. The contact information may include, for example, an e-mail address, telephone number, device identifier, etc. In some embodiments, an account profile 208 may also be configured to store historical travel experience and transaction data related to past transactions, travel activities, and travel experiences of the related traveler 104 and/or transaction account.

The processing server 102 may also include a rules database 210. The rules database 210 may be configured to store a plurality of transaction rules 212 using a suitable data storage format and schema. The rules database 210 may be a relational database that utilizes structured query language for the storage, identification, modifying, updating, accessing, etc. of structured data sets stored therein. Each transaction rule 212 may be a structured data set configured to store data related to a rule for identifying travel service options. The transaction rule 212 may include data used in the identification of a travel service option, which may include one or more data values used as a trigger for the travel service option, and one or more data values used to identify the subsequent travel service option. For instance, a transaction rule 212 may be triggered upon the receipt of a data message indicating arrival by the traveler 104 at an airport that specifies that ground transportation services may be identified. In some instances, a transaction rule 212 may also include criteria for the identification of the services indicated by the rule, such as criteria related to frequency of restaurant type transactions to for the identification of restaurants as travel service options. A transaction rule 212 may also include one or more required actions. A required action may be an action that is to be performed as related to the identified travel service options. For instance, a required action may be to display a list of service providers 106, display a map to a geographic location, prompt the traveler 104 for further information or instructions, etc.

The processing server 102 may include a service database 214. The service database 214 may be configured to store a plurality of service profiles 216 using a suitable data storage format and schema. The service database 214 may be a relational database that utilizes structured query language for the storage, identification, modifying, updating, accessing, etc. of structured data sets stored therein. Each service profile 216 may be a structured data set configured to store data related to a service provider 106. The service profile 216 may include data associated with the related service provider 106, which may be used in the identification of travel service options. Such data may include, for instance, a provider name, provider industry, provider type, pricing information, contact information, geographic location, etc.

The processing server 102 may include a querying module 218. The querying module 218 may be configured to execute queries on databases to identify information. The querying module 218 may receive one or more data values or query strings, and may execute a query string based thereon on an indicated database, such as the account database 206, to identify information stored therein. The querying module 218 may then output the identified information to an appropriate engine or module of the processing server 102 as necessary. The querying module 218 may, for example, execute a query on the account database 206 to identify an account profile 208 related to a traveler 104 for which a data message is received from the service provider 106. The querying module 218 may also be configured to execute queries to update account profiles 208 in the account database 206, identify transaction rules 212 for identifying travel service options, identify service profiles 216 for identifying data related to travel service options, etc.

The processing server 102 may also include a generation module 220. The generation module 220 may be configured to generate data messages for use by the processing server 102 in performing the functions discussed herein. The generation module 220 may receive data as input, may generate a data message that includes the data, and may output the data message to another module or engine of the processing server 102. In some instances, the generation module 220 may receive formatting instructions as input for formatting of the data message. In other instances, the generation module 220 may be configured to identify formatting rules for formatting the data message. Data messages may be formatted based on the contact information in an account profile 208, the service provider 106, mobile network operator 110, or traveler device 108 to which the data message is directed, etc.

The processing server 102 may also include a transmitting device 222. The transmitting device 222 may be configured to transmit data over one or more networks via one or more network protocols. In some embodiments, the transmitting device 222 may be configured to transmit data over the payment rails, such as using specially configured infrastructure associated with payment networks 112 for the transmission of transaction messages that include sensitive financial data and information, such as identified payment credentials. In some instances, the transmitting device 222 may be configured to transmit data to service providers 106, traveler devices 108, mobile network operators 110, payment networks 112, and other entities via alternative networks, such as the Internet. In some embodiments, the transmitting device 222 may be comprised of multiple devices, such as different transmitting devices for transmitting data over different networks, such as a first transmitting device for transmitting data over the payment rails and a second transmitting device for transmitting data over the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to service providers 106, traveler devices 108, and mobile network operators 110 that are superimposed or otherwise encoded with data messages comprising travel service options and required actions. The transmitting device 222 may also electronically transmit data signals to traveler devices 108 or service providers 106 that are superimposed or otherwise encoded with requests for data, such as may be transmitted to a service provider 106 to request data for inclusion in a travel service option or for determining a required action.

The processing server 102 may also include a memory 224. The memory 224 may be configured to store data for use by the processing server 102 in performing the functions discussed herein. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein.

Process for Providing Travel Service Options

Figure 3:
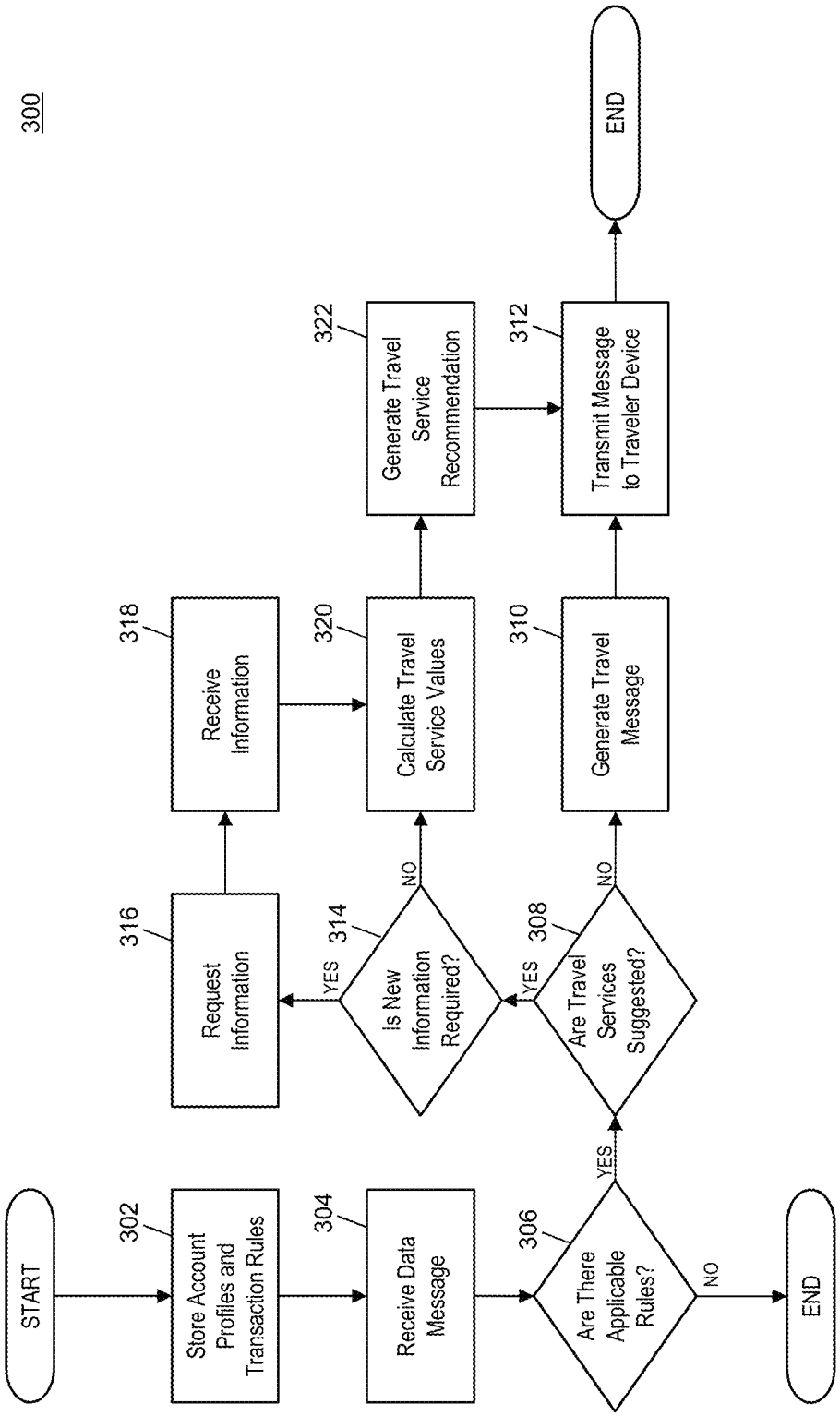
FIG. 3 is a flow diagram illustrating a process for providing travel service options to a traveler mobile device using the processing server of FIG. 2 in accordance with exemplary embodiments.

FIG. 3 illustrates a process 300 for the providing of travel service options to a traveler device 108 using a transportation mobility platform provided by the processing server 102 of the system 100.

In step 302, the querying module 218 of the processing server 102 may execute queries on the account database 206 and rules database 210 to store account profiles 208 and transaction rules 212, respectively. In step 304, the receiving device 202 of the processing server 102 may receive a data message from a service provider 106. The data message may include at least an account identifier, a travel reservation, and one or more data fields. In some embodiments, the data message may be a transaction message. The travel reservation may include data related to a travel activity, where the one or more data fields may include additional data related thereto. In instances where a payment transaction is involved, the one or more data fields may include transaction data.

In step 306, the processing server 102 may determine if there are any transaction rules 212 applicable to the received data message. The determination may be based on a query of the rules database 210 by the querying module 218 to identify if there are any transaction rules 212 that are triggered by the travel reservation and/or data included in the one or more data fields. If no applicable transaction rules 212 are identified, such as if the data message is for the traveler 104 arriving at their home (e.g., and thus ending their travel experience), then the process 300 may be completed. If an applicable transaction rule 212 is identified, then, in step 308, the processing server 102 may determine if there are any travel service options suggested. The determination may be based on application of the transaction rule 212 to the travel reservation and data included in the one or more data fields.

If no travel service options are suggested, then, in step 310, the generation module 220 of the processing server 102 may generate a travel message. The travel message may include the travel reservation and/or data from the one or more data fields included in the received data message. The travel message may also include additional data associated with the traveler's travel experience, such as may be identified in the traveler's account profile 208. For example, the travel reservation may be for check-in for a flight, where the travel message may include flight information (e.g., departure time, arrival time, length, gate information, etc.) as well as a reminder of a dinner reservation they have later that evening. In step 312, the transmitting device 222 of the processing server 102 may electronically transmit a data signal superimposed or otherwise encoded with the travel message to the traveler device 108. In some instances, the data signal may be transmitted directly to the traveler device 108, or via the service provider 106 and/or an associated mobile network operator 110.

If, in step 308, the processing server 102 determines that a travel service option is suggested, then, in step 314, the processing server 102 may determine if new information is required. The determination may be based on the transaction rule 212 and/or data or the lack thereof in a service profile 216 identified (e.g., via a query executed by the querying module 218 on the service database 214) for the recommended travel service option. For instance, a price estimate for a car service may be required. In some cases, the estimate may not require new information (e.g., due to data stored in the service profile 216 related to the car service). In other cases, the estimate may require the car service to be contacted for an estimate.

If it is determined that a new information is required, then, in step 316, the transmitting device 222 of the processing server 102 may electronically transmit a data request to the related service provider 106. In step 318, the receiving device 202 of the processing server 102 may receive the requested information from the related service provider 106. Once the information has been received, or if no new information was required, then, in step 320, a suitable module or engine of the processing server 102 may calculate values related to the travel service option, such as time estimates, price estimates, etc. In step 322, the generation module 220 of the processing server 102 may generate a travel service recommendation, which may be a travel message that includes the identified travel service option(s) and the calculated values related thereto. The process 300 may then proceed to step 312, where the travel service recommendation is electronically transmitted to the traveler device 108 by the transmitting device 222 of the processing server 102.

Graphical User Interface

FIGS. 4A-4D illustrate exemplary graphical user interfaces of the traveler device 108 for displaying travel messages and travel service recommendations to the traveler 104 for use in performing the functions discussed herein.

Figure 4B:
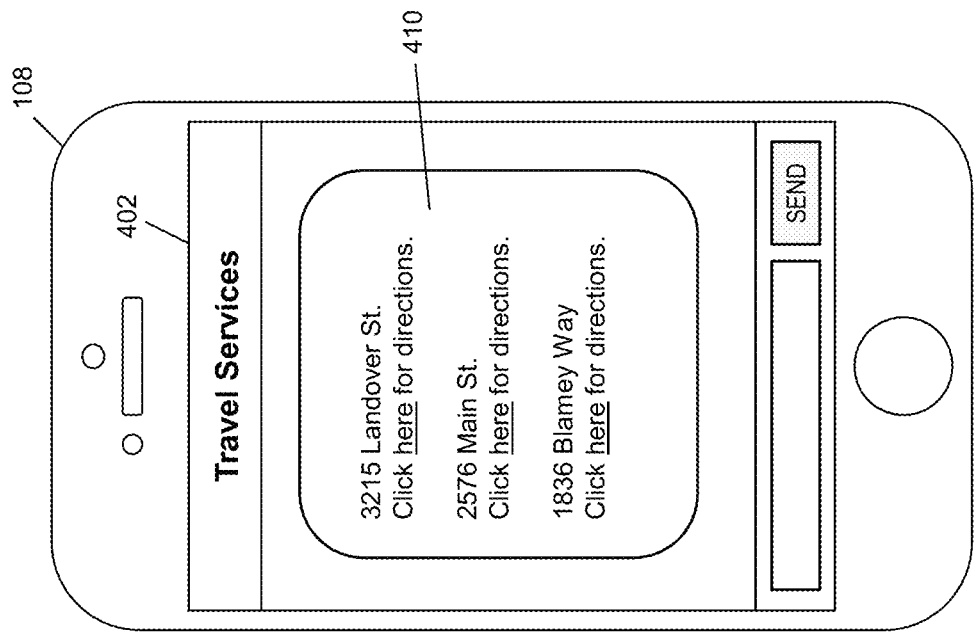
FIGS. 4A-4D are diagrams illustrating graphical user interfaces of the traveler device of FIG. 1 for displaying travel service options to a traveler using the processing server of FIG. 2 in accordance with exemplary embodiments.
Figure 4A:
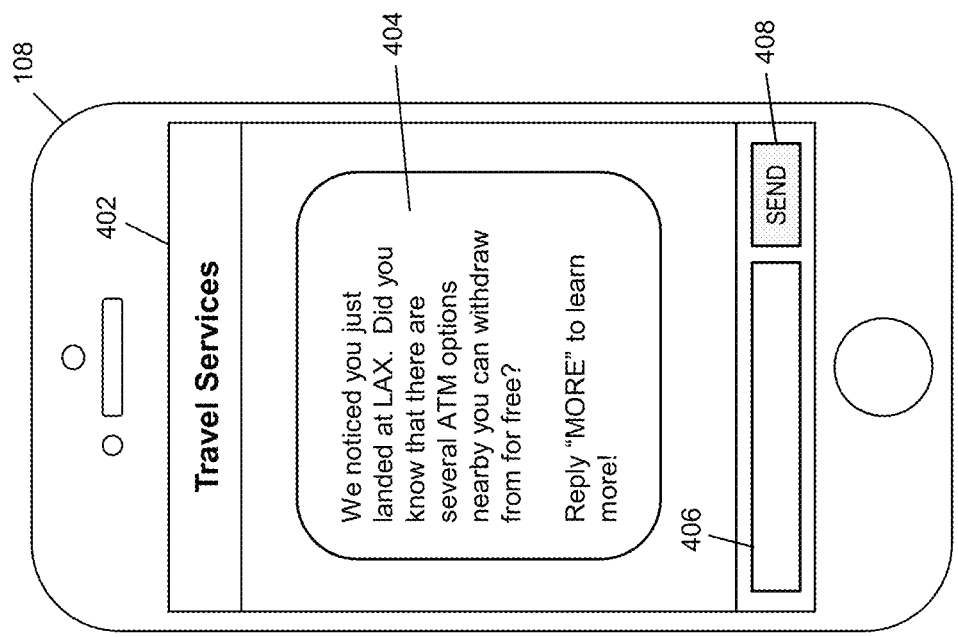
Figure 4D:
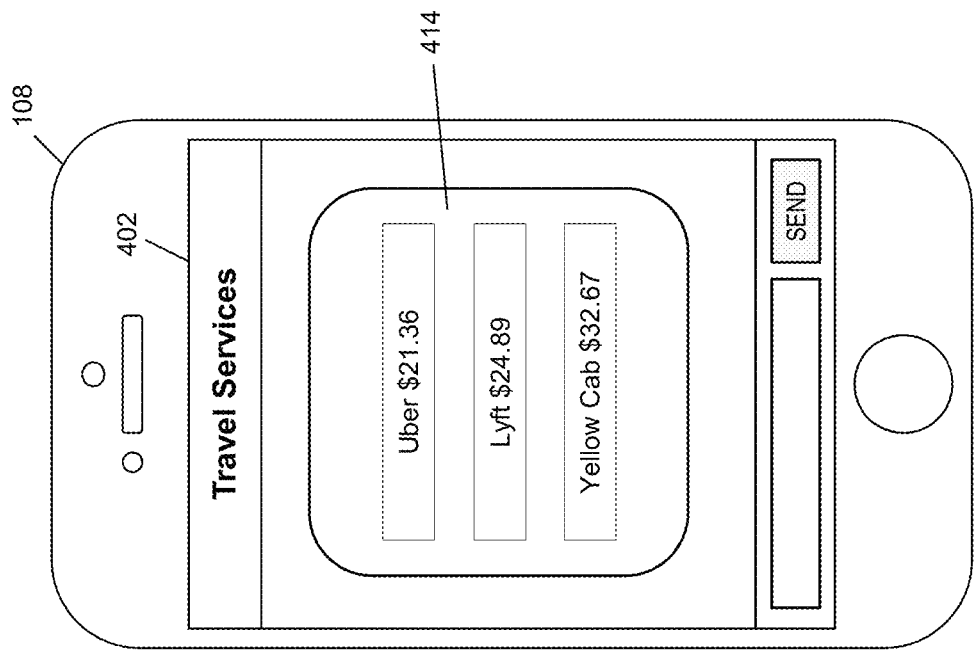

As illustrated in FIG. 4A, a traveler device 108 may include a display device 402. The display device 402 may be configured to display data to the traveler 104 and receive input from the traveler 104, and may be any suitable type of device therefore, such as a capacitive touch display. The display device 402 may be configured to display a travel message 404 to the traveler 104. The travel message 404 illustrated in FIG. 4A may be a travel message received when the traveler 104 arrives at a destination airport following air travel, such as may be triggered via the receipt of a data message from a service provider 106. In the example illustrated in FIG. 4A, the travel message 404 may be received via a short messaging service message application. In such an instance, the short messaging service application may include a text field 406 and a submit button 408, which may be used to submit a short messaging service message to the recipient. In the illustrated example, the traveler 104 may reply to the travel message 404 with "MORE" to receive additional information.

If the traveler 104 responds to the travel message 404 with the stated response, then the traveler 104 may receive a travel services recommendation 410, illustrated in FIG. 4B. The travel services recommendation 410 may include data that is related to one or more travel service options, as may be identified by the processing server 102 upon receipt of the data message. In the illustrated example, the travel service options may be automated teller machines (ATMs) at which the traveler 104 may withdraw currency from for free after arriving at their destination airport. The travel service recommendation 410 includes a list of each of the identified ATMs, as well as a link to receive directions for the selected ATM. In such an instance, the link may be a link to another application program configured to display directions to the corresponding address.

Figure 4C:
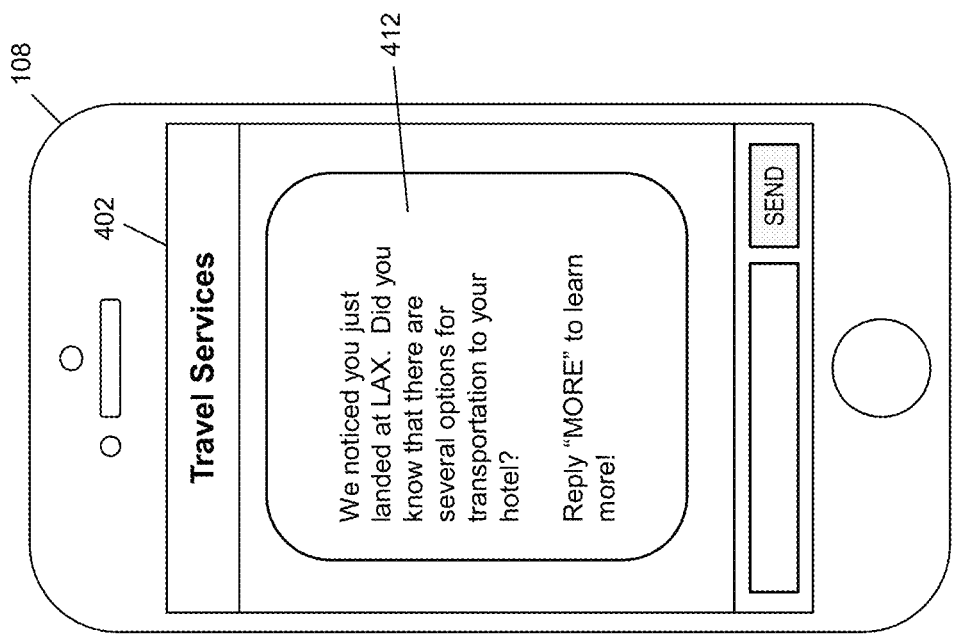

FIG. 4C illustrates another travel message 412 that may be received by the traveler device 108. The travel message 412 may be received once the traveler 104 arrives at a destination airport after air travel, and may indicate to the traveler 104 that travel service options regarding transportation to their hotel (e.g., as may be identified in their account profile 208) from the airport. If the traveler 104 responds to request the options, then the traveler 104 may receive the travel service recommendation 414 illustrated in FIG. 4D. The travel service recommendation 414 includes a list of three different travel service options, which represent ground transportation choices that may be selected by the traveler 104. Each travel service option includes a name of the service provider 106 related thereto and a price estimate for the ground transportation. In some instances, the traveler 104 may be able to select one of the travel service options, which may contact the related service provider 106 to arrange the service, such as via a telephone call, application program related to the service provider 106 (e.g., and already installed on the traveler device 108 or to prompt installation thereof), web page associated with the service provider 106, etc.

Figure 5:
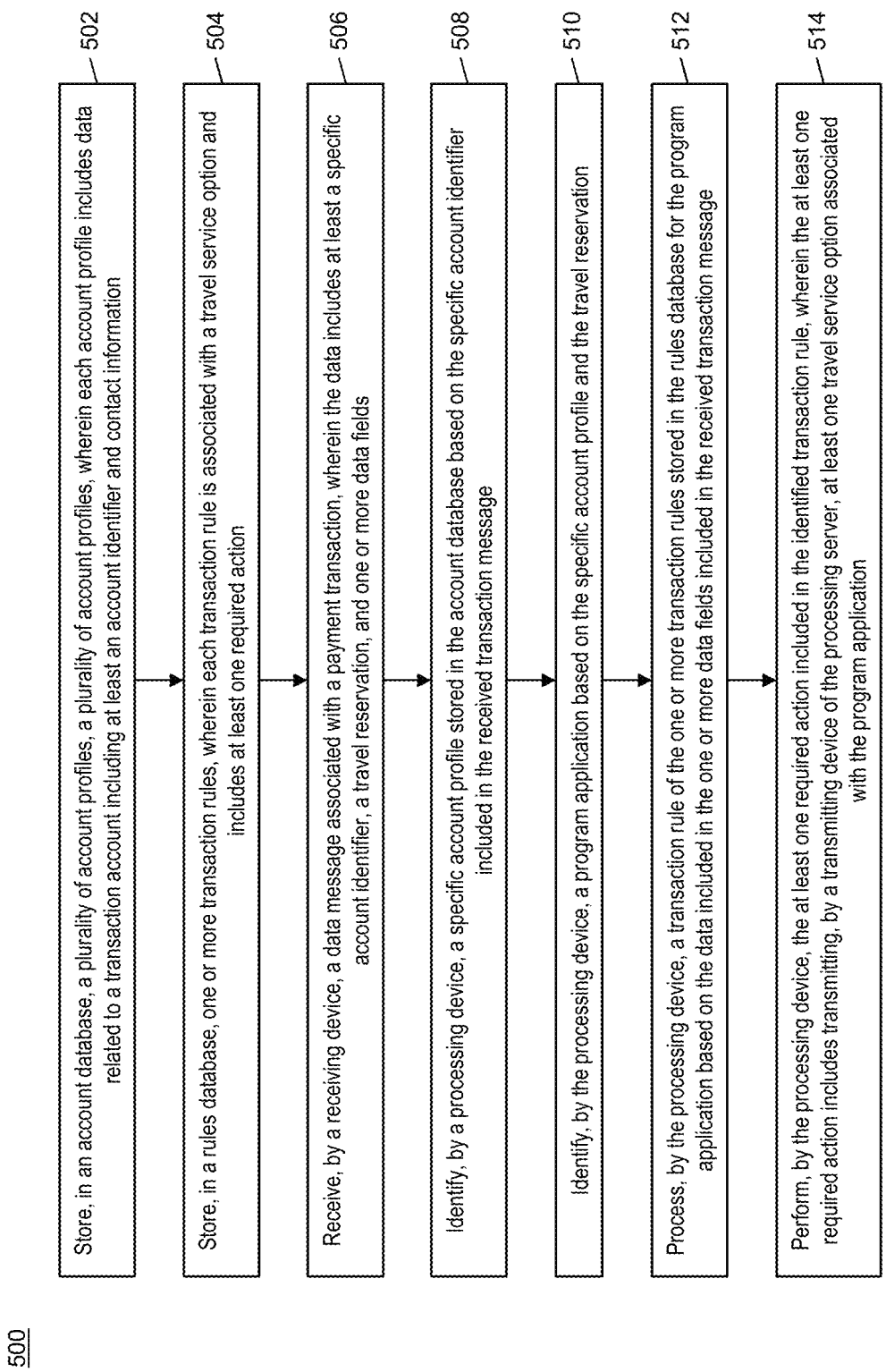
FIG. 5 is a flow chart illustrating an exemplary method for providing travel service options to a traveler mobile device in accordance with exemplary embodiments.

Exemplary Method for Providing Travel Service Options to a Traveler Mobile Device FIG. 5 illustrates a method 500 for the providing of travel service options to a traveler mobile device (e.g., the traveler device 108) via a transportation mobility platform that is configured to use travel reservation data to identify service options via a backend platform.

In step 502, a plurality of account profiles (e.g., account profiles 208) may be stored in an account database (e.g., the account database 206) of a processing server (e.g., the processing server 102), wherein each account profile includes data related to a transaction account including at least an account identifier and contact information. In step 504, one or more transaction rules (e.g., transaction rules 212) may be stored in a rules database (e.g., rules database 210) of the processing server, wherein each transaction rule is associated with a travel service option and includes at least one required action.

In step 506, a data message associated with a transaction may be received by a receiving device (e.g., the receiving device 202) of the processing server, wherein the data message includes at least a specific account identifier, a travel reservation, and one or more data fields. In step 508, a specific account profile stored in the account database may be identified by a processing device based on the specific account identifier included in the received transaction message. In step 510, a program application may be identified by the processing device based on the specific account profile and the travel reservation.

In step 512, a transaction rule of the one or more transaction rules stored in the rules database may be processed by the processing device for the program application based on the data included in the one or more data fields included in the received transaction message. In step 514, the at least one required action included in the identified transaction rule may be performed by the processing device of the processing server, wherein the at least one required action includes transmitting, by a transmitting device (e.g., the transmitting device 222) of the processing server, at least one travel service option associated with the program application.

In one embodiment, the at least one travel service option may include at least one of: a transportation service, a flight option, a ticket purchase, and a dining option. In some embodiments, the program application may be previously stored in the traveler mobile device. In one embodiment, the program application may be based on the travel service option. In some embodiments, the specific account identifier may be included in a data field configured to store a primary account number. In one embodiment, each account profile may further include transaction data associated with a plurality of payment transactions involving the related transaction account.

In some embodiments, the method 500 may further include storing, in a services database (e.g., the service database 214), one or more service profiles (e.g., service profiles 216), wherein each service profile includes data related to the travel service option. In a further embodiment, the at least one required action may further include identifying, by the processing device, at least one related service profile stored in the services database, and the transmitted at least one travel service option may further include a service data included in the identified at least one related service profile. In one embodiment, the data message may be a transaction message formatted based on one or more standards for the exchange of electronic transactions using payment cards. In a further embodiment, the one or more standards may includes the ISO 8583 standard.

Payment Transaction Processing System and Process

Figure 6:
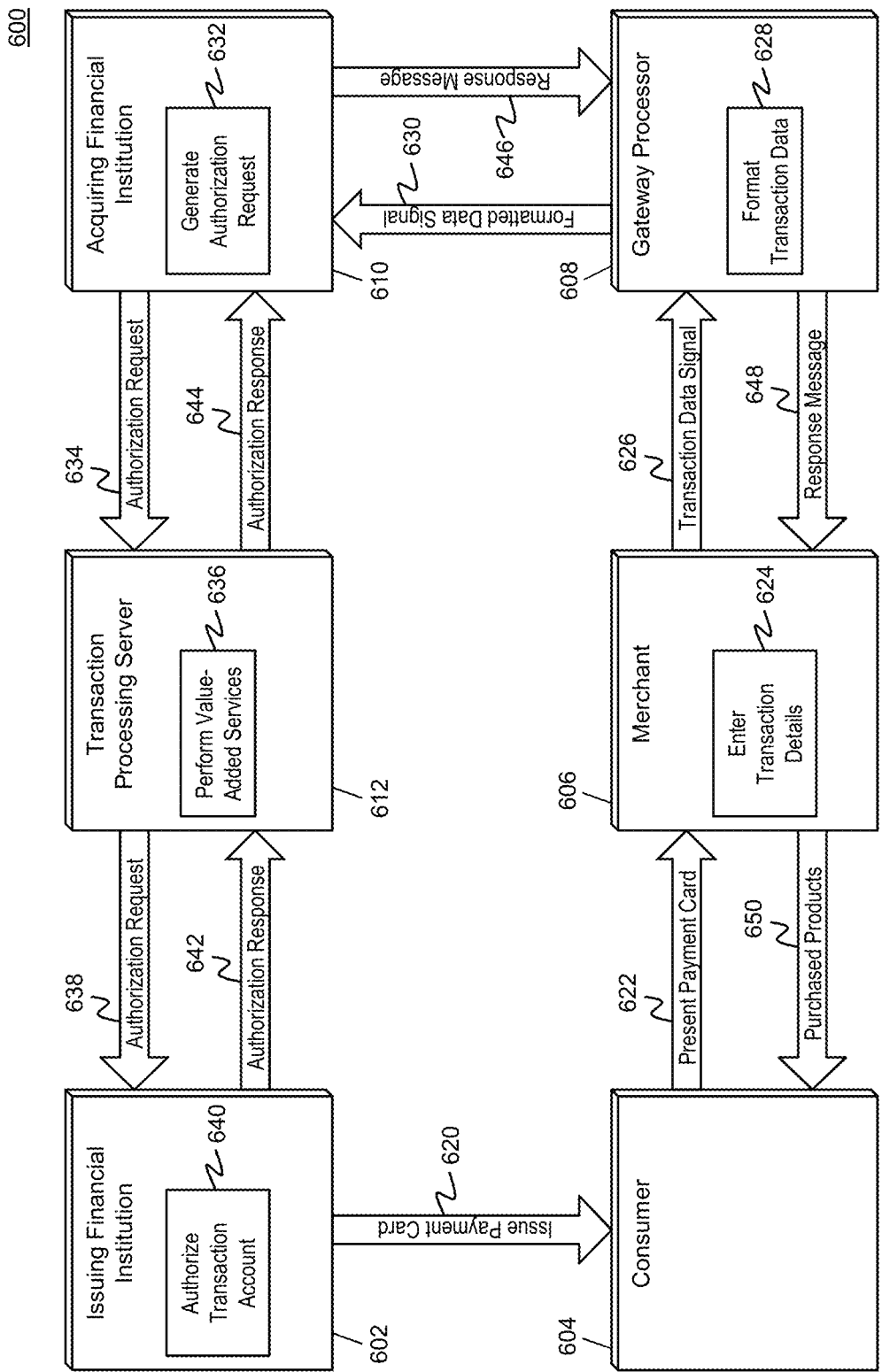
FIG. 6 is a flow diagram illustrating the processing of a payment transaction in accordance with exemplary embodiments.

FIG. 6 illustrates a transaction processing system and a process 600 for the processing of payment transactions in the system, which may include the processing of thousands, millions, or even billions of transactions during a given period (e.g., hourly, daily, weekly, etc.). The process 600 and steps included therein may be performed by one or more components of the system 100 discussed above, such as the processing server 102, issuing institution 104, traveler 106, payment card 108, point of sale 110, merchant system 112, acquiring institution 114, payment network 116, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3 and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a traveler 604. The issuing financial institution may be a financial institution, such as a bank, or other suitable type of entity that administers and manages payment accounts and/or payment instruments for use with payment accounts that can be used to fund payment transactions. The traveler 604 may have a transaction account with the issuing financial institution 602 for which the issued payment card is associated, such that, when used in a payment transaction, the payment transaction is funded by the associated transaction account. In some embodiments, the payment card may be issued to the traveler 604 physically. In other embodiments, the payment card may be a virtual payment card or otherwise provisioned to the traveler 604 in an electronic format.

In step 622, the traveler 604 may present the issued payment card to a merchant 606 for use in funding a payment transaction. The merchant 606 may be a business, another traveler, or any entity that may engage in a payment transaction with the traveler 604. The payment card may be presented by the traveler 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the traveler 604 associated with the payment card and additional details associated with the transaction, such as a transaction amount, time and/or date, product data, offer data, loyalty data, reward data, merchant data, traveler data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the traveler 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 660, assuming the transaction was approved, the merchant 606 may then provide the products purchased by the traveler 604 as part of the payment transaction to the traveler 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 602. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a traveler 604 to fund the payment transaction.

Computer System Architecture

Figure 7:
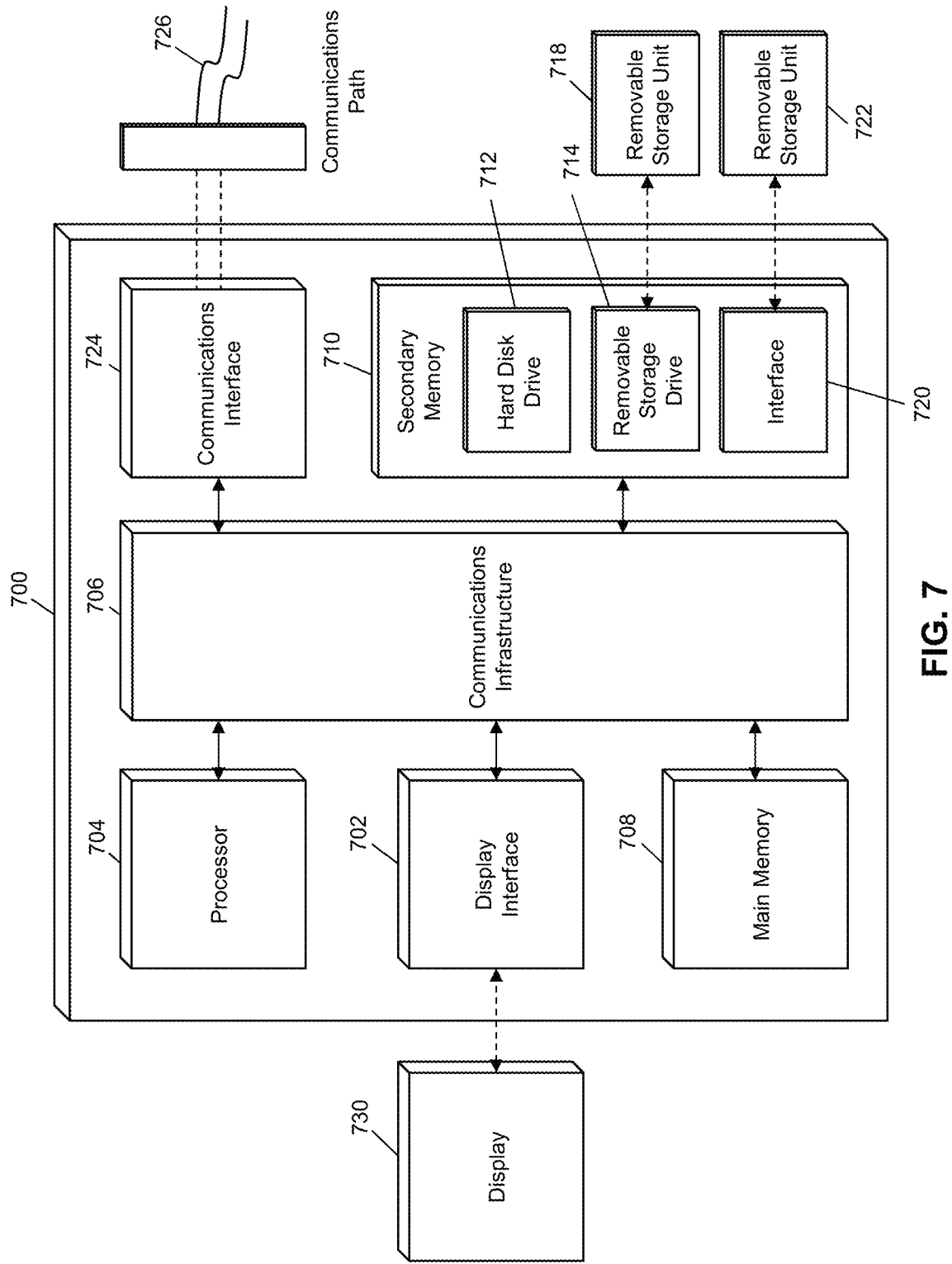
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3, 5, and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for providing travel service options to a traveler mobile device. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for providing travel service options to a traveler mobile device, comprising:
   storing, in an account database of a processing server, a plurality of account profiles, wherein each account profile (i) is associated with a traveler and the traveler's travel experiences, and (ii) includes data related to a transaction account including at least an account identifier and contact information;
   storing, in a rules database of the processing server, one or more transaction rules, wherein each transaction rule includes (i) data used in identifying a travel service option, and (ii) at least one required action;
   receiving, by a receiving device of the processing server, a data message from a first service provider, wherein said data message is (i) associated with a transaction between the first service provider and the traveler for a travel-related service provided by the first service provider, and (ii) includes at least a specific account identifier, a travel reservation, and one or more data fields;
   identifying, by a processing device of the processing server, a specific account profile stored in the account database based on the specific account identifier included in the data message received from the first service provider;
   identifying, by the processing device of the processing server, at least one application program for accessing data associated with at least one second service provider, said identification of the at least one application program is based on the specific account profile and the travel reservation included in the data message received from the first service provider;
   identifying, by the processing device of the processing server, a transaction rule of the one or more transaction rules stored in the rules database for the at least one application program based on data included in the one or more data fields included in the data message received from the first service provider; and
   performing, by the processing device of the processing server, the at least one required action included in the identified transaction rule, wherein the at least one required action includes transmitting, by a transmitting device of the processing server, at least one travel service option associated with the at least one application program and the at least one second service provider.

2. The method of claim 1, wherein the at least one travel service option includes at least one of: a transportation service, a flight option, a ticket purchase, and a dining option.

3. The method of claim 1, wherein the application program is previously stored in the traveler mobile device.

4. The method of claim 1, wherein the application program is based on the travel service option.

5. The method of claim 1, wherein the specific account identifier is included in a data field configured to store a primary account number.

6. The method of claim 1, wherein each account profile further includes transaction data associated with a plurality of payment transactions involving the related transaction account.

7. The method of claim 1, further comprising:
storing, in a services database, one or more service profiles, wherein each service profile includes data related to the travel service option.

8. The method of claim 7, wherein
the at least one required action further includes identifying, by the processing device, at least one related service profile stored in the services database, and
the transmitted at least one travel service option further includes a service data included in the identified at least one related service profile.

9. The method of claim 1, wherein the data message is a transaction message formatted based on one or more standards for an exchange of electronic transactions using payment cards.

10. The method of claim 9, wherein the one or more standards includes the ISO 8583 standard.

11. A system for providing travel service options to a traveler mobile device, comprising:
an account database, of a processing server, configured to store a plurality of account profiles, wherein each account profile (i) is associated with a traveler and the traveler's travel experiences, and (ii) includes data related to a transaction account including at least an account identifier and contact information;
a rules database, of the processing server, configured to store one or more transaction rules, wherein each transaction rule includes (i) data used in identifying a travel service option, and (ii) at least one required action;
a receiving device, of the processing server, configured to receive a data message from a first service provider, wherein said data message is (i) associated with a transaction between the first service provider and the traveler for a travel-related service provider by the first service provider, and (ii) includes at least a specific account identifier, a travel reservation, and one or more data fields; and
a processing device, of the processing server, configured to:
identify a specific account profile stored in the account database based on the specific account identifier included in the data message received from the first service provider;
identify least one application program for accessing data associated with at least one second service provider, said identification of the at least one application program is based on the specific account profile and the travel reservation included in the data message received from the first service provider;
identify a transaction rule of the one or more transaction rules stored in the rules database for the at least one application program based on data included in the one or more data fields included in the data message received from the first service provider; and
perform the at least one required action included in the identified transaction rule, wherein the at least one required action includes transmitting, by a transmitting device of the processing server, at least one travel service option associated with the at least one application program and the at least one second service provider.

12. The system of claim 11, wherein the at least one travel service option includes at least one of: a transportation service, a flight option, a ticket purchase, and a dining option.

13. The system of claim 11, wherein the application program is previously stored in the traveler mobile device.

14. The system of claim 11, wherein the application program is based on the travel service option.

15. The system of claim 11, wherein the specific account identifier is included in a data field configured to store a primary account number.

16. The system of claim 11, wherein each account profile further includes transaction data associated with a plurality of payment transactions involving the related transaction account.

17. The system of claim 11, further comprising:
storing, in a services database, one or more service profiles, wherein each service profile includes data related to the travel service option.

18. The system of claim 17, wherein
the at least one required action further includes identifying, by the processing device, at least one related service profile stored in the services database, and
the transmitted at least one travel service option further includes a service data included in the identified at least one related service profile.

19. The system of claim 11, wherein the data message is formatted based on one or more standards for an exchange of electronic transactions using payment cards.

20. The system of claim 19, wherein the one or more standards includes the ISO 8583 standard.

* * * * *